United States Patent [19]

Okuyama

[11] Patent Number: 5,327,438
[45] Date of Patent: Jul. 5, 1994

[54] ERROR CORRECTION SYSTEM CAPABLE OF CORRECTING AN ERROR IN A PACKET HEADER BY THE USE OF A REED-SOLOMON CODE

[75] Inventor: Hideki Okuyama, Tokyo, Japan

[73] Assignee: NEC Corporation, Tokyo, Japan

[21] Appl. No.: 133,267

[22] Filed: Oct. 7, 1993

Related U.S. Application Data

[63] Continuation of Ser. No. 664,732, Mar. 5, 1991, abandoned.

[30] Foreign Application Priority Data

Mar. 5, 1990 [JP]  Japan ................................. 2-54749

[51] Int. Cl.[5] .......................................... G06F 11/10
[52] U.S. Cl. ................................. 371/37.1; 371/40.1
[58] Field of Search ................. 371/37.1, 38.1, 39.1, 371/40.1; 370/85.1, 94.1

[56] References Cited

U.S. PATENT DOCUMENTS

| | | | |
|---|---|---|---|
| 4,500,989 | 2/1985 | Dahod | 370/85 |
| 4,680,764 | 7/1987 | Suzuki et al. | 371/37.7 |
| 4,827,478 | 5/1989 | Chan | 371/40.1 |
| 4,979,174 | 12/1990 | Cheng et al. | 371/41 |

FOREIGN PATENT DOCUMENTS 2216752A 10/1989 United Kingdom .

OTHER PUBLICATIONS

Ritter, The Greate CRC Mystery, Dr. Dobb's Journal, Feb. 1986, pp. 26-28, 30, 32 and 34.

IEEE Transactions on Communications, vol. 35, No. 11, Nov. 1987, pp. 1113-1123, Mortimer et al., "The Design of a High-Performance Error-Correcting Coding Scheme for the Canadian Broadcast Telidon System Based on Reed-Solomon Codes."

IEEE Transactions on Communications, vol. 37, No. 12, Dec. 1989, pp. 1264-1274, Pursley, "Delay and Thoughput for Three Transmission Schemes in Packet Radio Networks."

Primary Examiner—Charles E. Atkinson
Attorney, Agent, or Firm—Sughrue, Mion, Zinn, Macpeak & Seas

[57] ABSTRACT

In an error correcting system for use in transmitting a packet from a transmitter to a receiver, a packet header is preceded by an input signal and is formed by a Reed-Solomon code in the transmitter by adding an error correcting code to a header information signal. In the receiver, a plurality of syndromes are calculated by a syndrome calculator in response to the packet header to detect whether or not at least one error is included in the packet header. On detection of at least one error, an error correction circuit is energized in accordance with a program to locate and to correct the at least one error on the basis of procedure determined for correction of the Reed-Solomon code and may be structured by a plurality of hardware circuits.

5 Claims, 5 Drawing Sheets

ERROR CORRECTION SYSTEM CAPABLE OF CORRECTING AN ERROR IN A PACKET HEADER BY THE USE OF A REED-SOLOMON CODE

This is a continuation of application No. 07/664,732 filed Mar. 5, 1991 and now abandoned.

BACKGROUND OF THE INVENTION

This invention relates to an error correction system for use in a packet exchange system which can transfer packets without the necessity of retransmitting of information, such as datum, a speech, and an image.

Heretofore, a packet exchange system of the type described is used for transferring a packet from a transmission end to a destination or reception end. In this event, information signals, such as a speech or voice signal and an image signal, are preceded by a packet header and are transmitted or conveyed by the packet in the packet exchange system which is operable in accordance with non-high level data link control procedure. The packet header is helpful to specify the destination reception end and the transmission end.

It is to be noted that no re-transmission is carried out in such a system and that the packet should be delivered to the destination reception end without failure. Otherwise, the information signals are undesirably sent to a wrong one of the reception ends. Therefore, correct transmission is required for the packet header as compared with transmission of the information signals, such as the speech and the image signals.

In general, it is known to use a Hamming code or a parity bit in connection with an information signal of a comparatively short data length of, for example, several bits. In this case, a single bit error or a double bit error is corrected by use of the Hamming code or addition of the parity bit when the information signal has a short data length, as mentioned before.

It is mentioned here that the packet header is usually composed of a long data length of, for example, several tens of bits. In addition, the packet exchange system is often used in very bad circumstances such that the packet header is subjected to the influence of noise. Taking this into account, a double error, a triple error or a t-tuple error more than the triple error very often takes place in the packet header and may be preferably corrected in each packet header.

Conventionally, consideration is however directed neither to the correction of the packet header nor to the correction of a double or a triple error.

SUMMARY OF THE INVENTION

It is an object of this invention to provide an error correction system which is applicable to a packet exchange system and is capable of correcting a wide variety of errors in a packet header.

It is another object of this invention to provide an error correction system of the type described, which is capable of correcting both single and double errors in the packet header.

It is still another object of this invention to provide a transmitter which is applicable to the error correction system and which is capable of transmitting a packet header which can correct the single or the double error.

It is yet another object of this invention to provide a receiver which is applicable to the error correction system and which is small in size and capable of preferably correcting the double error in the packet header.

According to an aspect of this invention, a transmitter is for use in transmitting a packet which includes an input signal and a header information signal which precedes said input signal. The transmitter comprises packet header forming means responsive to the header information signal and operable in accordance with a predetermined algorithm determined for production of a Reed-Solomon code. The packet header forming means is for forming a packet header which is composed of the header information signal and an error correcting code signal for correcting the header information signal. The error correcting code signal is formed by the Reed-Solomon code. The transmitter further comprises signal producing means for producing the packet header followed by the input signal to form the packet.

According to another aspect of this invention, a receiver is for use in combination with the transmitter to receive the packet as a reception packet including a reception packet header corresponding to the packet header and to produce a reception packet header information signal and a reception error correcting code signal corresponding to the packet header information and the error correcting code signal, respectively. The receiver comprises syndrome calculation means responsive to the reception packet header for calculating a plurality of syndromes on the basis of preselected formulae determined for the Reed-Solomon code, error detecting means coupled to the syndrome calculating means for detecting occurrence of an error in the reception packet header by monitoring the syndromes to produce an error detection signal on detection of the error, and error correcting means formed by a hardware circuit, energized by the error detection signal, and operable in accordance with a program determined for processing the Reed-Solomon code, for correcting the error in said reception packet header to produce the reception packet header information signal subjected to the error correction.

DESCRIPTION OF THE PREFERRED EMBODIMENT

Figure 1:
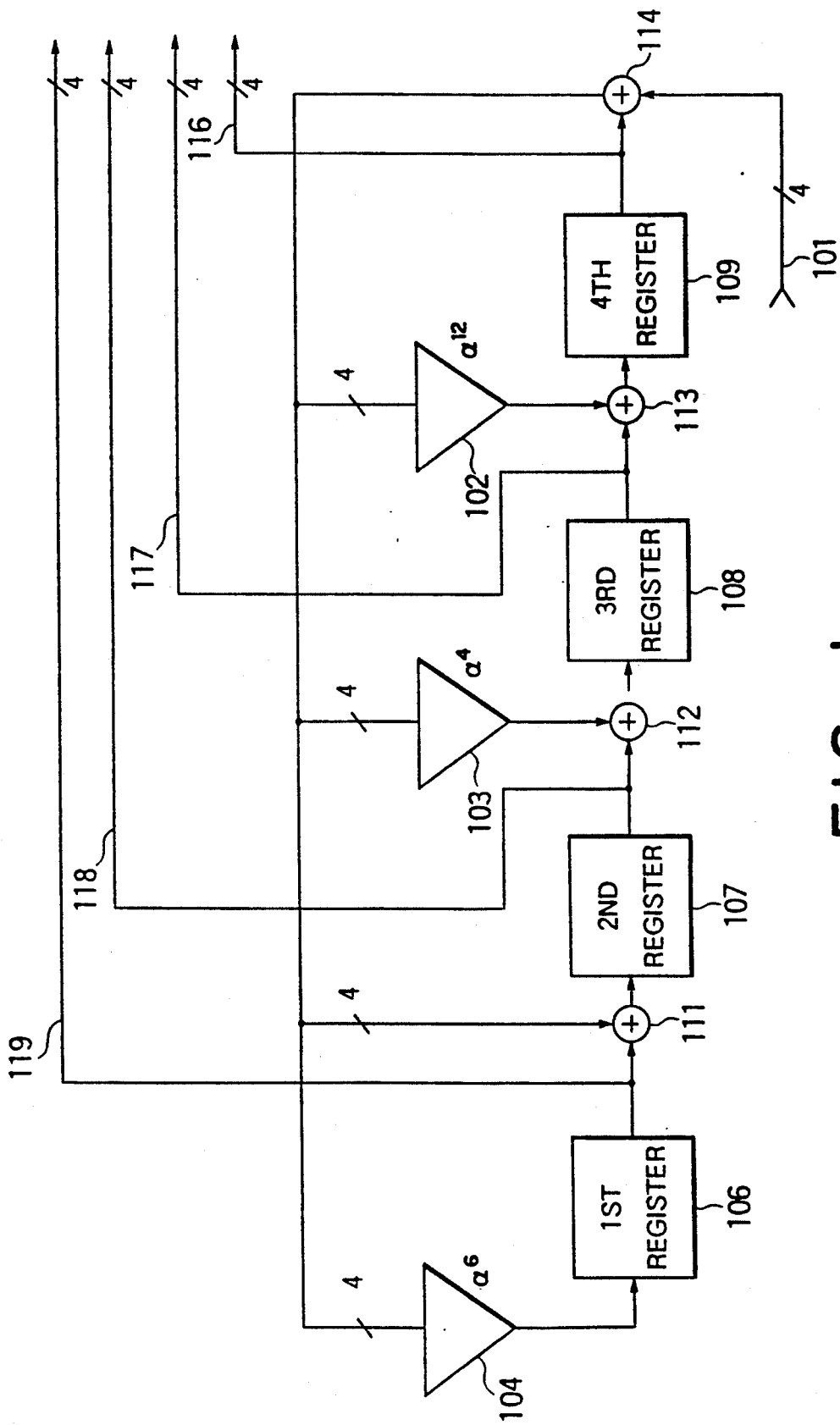
FIG. 1 is a block diagram of a transmitter used for an error correction system according to a preferred embodiment of this invention.
Figure 2:
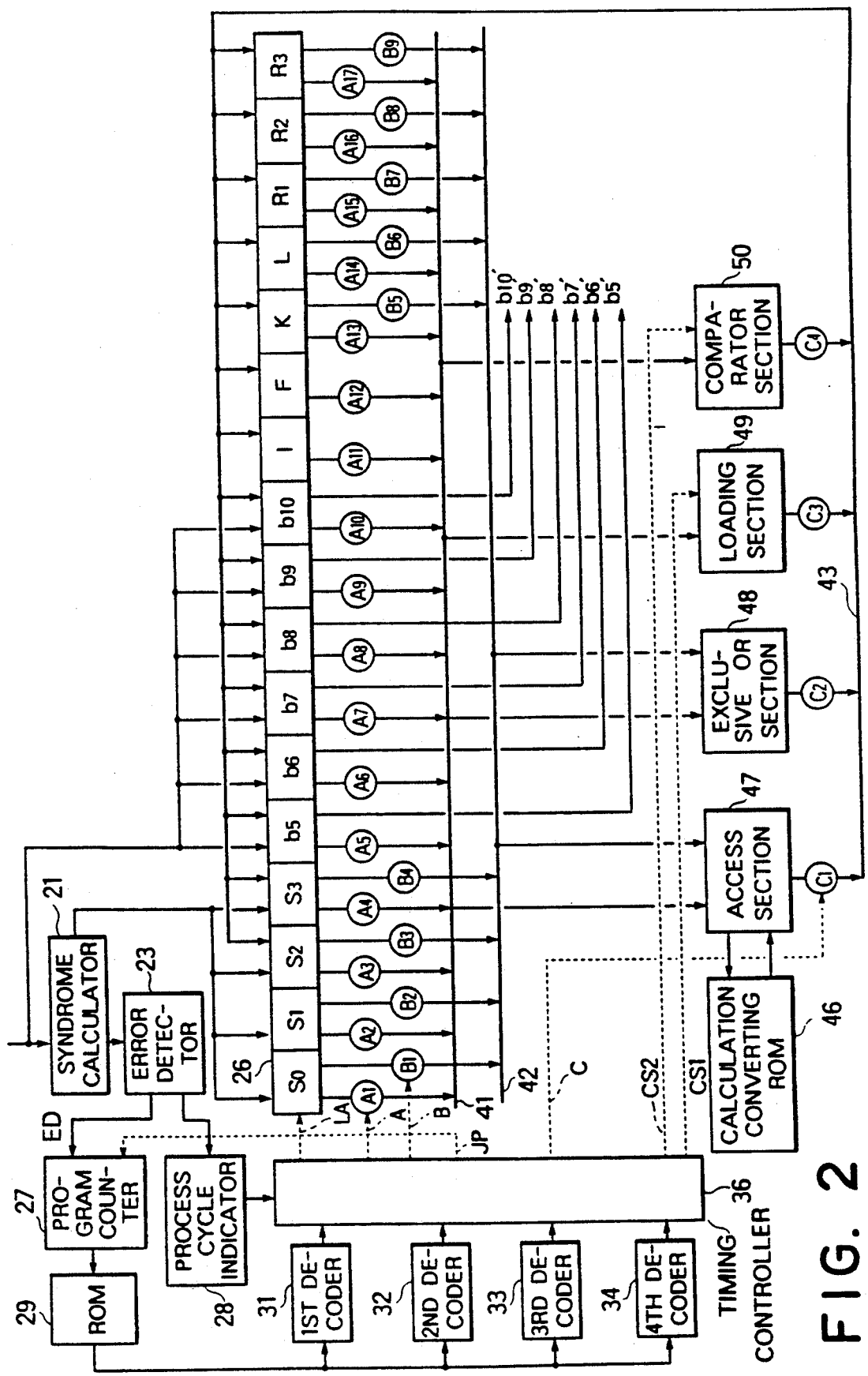
FIG. 2 is a block diagram of a receiver used for the error correction system according to the preferred embodiment of this invention.

Referring to FIG. 1, an error correction system according to a preferred embodiment of this invention comprises a transmitter and a receiver both of which are illustrated in FIGS. 1 and 2, respectively, and which are practically implemented by a very large scale integrated circuit (VLSI).

Briefly, the transmitter illustrated in FIG. 1 produces a packet information signal which may be, for example, a data signal, a speech signal, or an image signal. In this case, the information signal is preceded by a packet header which specifies a destination receiver and the like and which comprises a header or a significant information signal of twenty-four bits and an error correcting code (namely, a redundancy code) following the header information signal. The packet information signal itself is directly transmitted regardless of this invention and will not be described any longer because no error correcting code is attached to the packet information signal itself which is composed of various different signals, such as the data signal, the speech signal, the image signal, as mentioned above.

Figure 3:
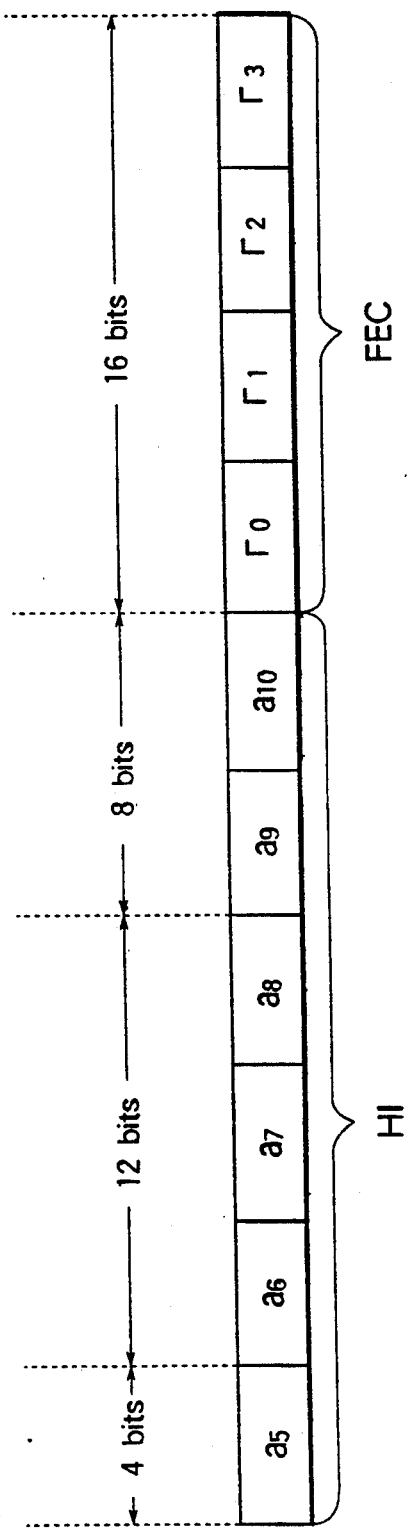
FIG. 3 is a time chart for use in describing operation of the transmitter illustrated in FIG. 1.

In FIG. 3, the packet header is divided into the header information signal depicted at HI (FIG. 3) and the error correcting code which is shown as a forward error correcting code (FEC). The header information signal HI is subdivided into six signal units each of which is composed of four bits, namely, a half byte. The four bits are assumed to form a single symbol. The six signal units are represented by a5, a6, a7, a8, a9, and a10 with a0 to a4 omitted. This is because a0 to a4 are regarded as null data units in this invention, as will become clear as the description proceeds. In this connection, a5 to a10 may be referred to as first through sixth signal units, respectively, and regarded as being located at fifth through tenth symbol positions, respectively.

On the other hand, the forward error correcting code (FEC) is added to the first through the sixth signal units a5 to a10 and is composed of first through fourth error code units r0 to r3 each of which is composed of four bits, namely, a half byte. It is to be noted that the illustrated packet header is formed by a Reed-Solomon code which is defined on a Galois field FG ($2^4$). Herein, let the Reed-Solomon code have a total symbol number equal to 15, a significant information symbol number equal to 11, and a minimum hamming distance equal to 5 and be represented by RS (15, 11, 5). The Reed-Solomon code (15, 11, 5) can be defined by a polynomial P(x) of a fourteenth order which is given by:

$$P(x) = a_0 x^{14} + a_1 x^{13} + \ldots + a_{10} x^4 + r_0 x^3 + r_1 x^2 + r_2 x + r_3.$$

In the example, the significant symbol number is restricted to 6 and as a result, the total symbol number is equal to 10 as illustrated in FIG. 3. Under the circumstances, the first through the fourth error code units r0 to r3 which may be collectively called the redundancy code are calculated in accordance with Equations 1 through 4 given by:

$$r_0 = a_5 \cdot \alpha^7 \oplus a_6 \cdot \alpha^{13} \oplus a_7 \cdot \alpha^6 \oplus a_8 \cdot \alpha^{13} \oplus a_9 \cdot \alpha^{14} \oplus a_{10} \cdot \alpha^{12} \quad (1)$$

$$r_1 = a_5 \cdot \alpha^7 \oplus a_6 \cdot \alpha^6 \oplus a_7 \cdot \alpha^8 \oplus a_8 \cdot \alpha^7 \oplus a_9 \cdot \alpha^4 \oplus a_{10} \cdot \alpha^{12} \quad (2)$$

$$r_2 = a_5 \cdot \alpha \oplus a_6 \cdot \alpha^{12} \oplus a_7 \cdot \alpha^7 \oplus a_8 \cdot \alpha^0 \oplus a_9 \cdot \alpha^4 \oplus a_{10} \quad (3)$$

$$r_3 = a_5 \cdot \alpha^4 \oplus a_6 \cdot \alpha^{12} \oplus a_7 \cdot \alpha^4 \oplus a_8 \cdot \alpha^5 \oplus a_9 \cdot \alpha^3 \oplus a_{10} \cdot \alpha^6 \quad (3)$$

where
$\alpha^0 = (1000) = 8_H$, $\alpha^1 = (0100) = 4_H$,
$\alpha^2 = (0010) = 2_H$, $\alpha^3 = (0001) = 1_H$,
$\alpha^4 = (1100) = C_H$, $\alpha^5 = (0110) = 6_H$,
$\alpha^6 = (0011) = 3_H$, $\alpha^7 = (1101) = D_H$,
$\alpha^8 = (1010) = A_H$, $\alpha^9 = (0101) = 5_H$,
$\alpha^{10} = (1110) = E_H$, $\alpha^{11} = (0111) = 7_H$,
$\alpha^{12} = (1111) = F_H$, $\alpha^{13} = (1011) = B_H$,
$\alpha^{14} = (1001) = 9_H$, and $\alpha^{15} = \alpha^0$ and where in turn $\oplus$ is representative of an Exclusive OR operation between four bits and four bits, a dot (.) is representative of a multiplication between a couple of four bits, and H is representative of a hexadecimal number. If $x = \alpha^i$, and $y = \alpha^j$, such a multiplication is given by $\alpha^{(i+j) \bmod 15}$ and will be called a specific multiplication. When either of x and y is equal to 0, the multiplication of x and y is equal to 0(0000).

In FIG. 1, the transmitter is operable to calculate the first through the fourth error code units r0 to r3 in accordance with Equations 1 through 4 mentioned above. More specifically, the illustrated transmitter is successively supplied with an input signal of four bits, or each symbol unit in parallel through an input terminal 101. Each symbol unit of the packet header is sent to the transmitter in the order of a5, a6, a7, a8, a9 and a10.

In the example being illustrated, the transmitter comprises first through third multipliers 102 to 104 each of which carries out the multiplication between a couple of four bits, as mentioned above, and first through fourth registers 106 to 109 of four bits each of which is connected to first through fourth Exclusive OR gates 111 to 114 connected to the first through the third multipliers 104, 103, 102, and the input terminal 101.

With this structure, the first signal unit a5 of four bits is at first given as the input symbol unit to the input terminal 101 and is sent through the fourth Exclusive OR gate 114 to the first through the third multipliers 102 to 104 to be latched to the first through the fourth registers 106 to 109. In this event, the first register 106 is loaded with a product of $a_5 \cdot \alpha^6$ while the second register 107 is loaded with $a_5$. Likewise, the third and the fourth registers 108 and 109 are loaded with $a_5 \cdot \alpha^4$ and $a_5 \cdot \alpha^{12}$, respectively. Subsequently, the second through the sixth signal units a6 to a10 are supplied to the first through the third multipliers 102 to 104 through the input terminal 101 and the fourth Exclusive OR gate 114. As a result, the first through the fourth error code units r0 to r3 represented by Equations 1 to 4 are produced through first through fourth output lines 116 to 119, respectively. Such production of the first through the fourth error code units r0 to r3 is carried out in accordance with the predetermined polynomial. In addition, the multipliers 102 to 104 are known in the art and will not be described in detail later. Thus, a combination of the multipliers 102 to 104, the registers 106 to 109, and the Exclusive OR gates 111 to 114 serves to form the packet header and may be called a packet header forming circuit. The output lines 116 to 119 may be referred to as a signal producing circuit for the packet header.

Figure 4:
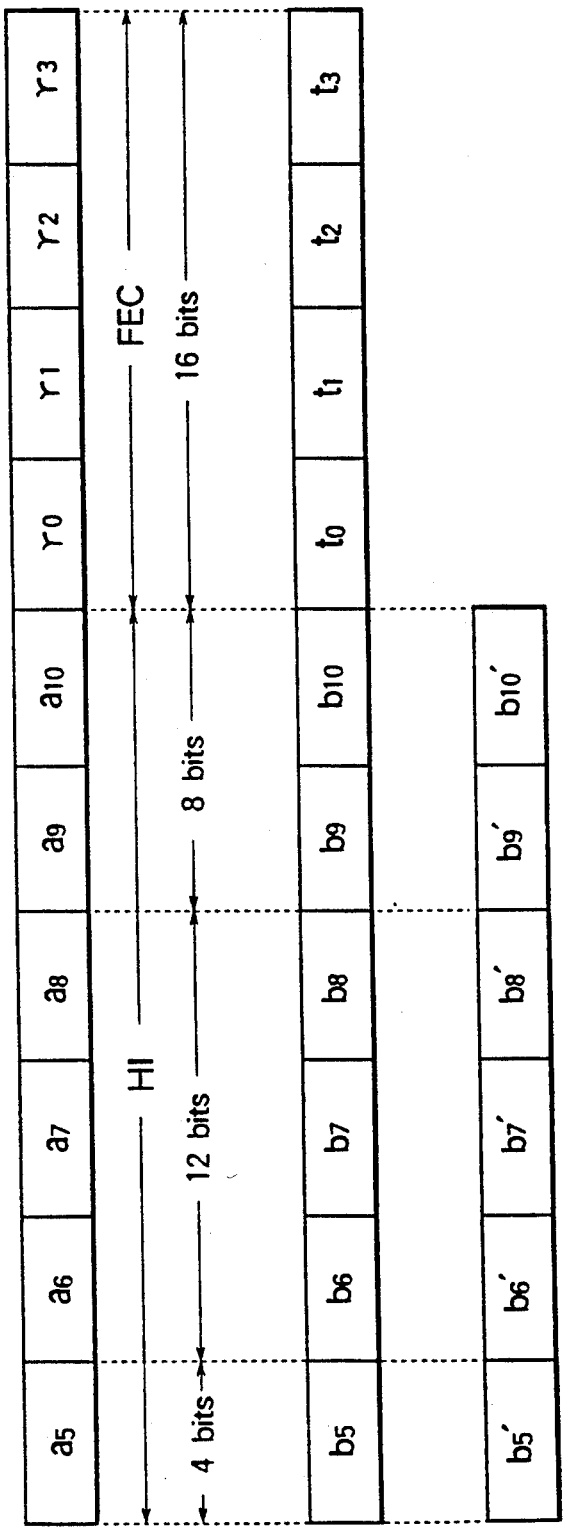
FIG. 4 is a time chart for use in describing a relationship between a transmission data signal and a reception data signal which are produced and received by the transmitter and the receiver, respectively.

Temporarily referring to FIG. 4, it is assumed that the first through the sixth signal units a5 to a10 and the first through the fourth error code units r0 to r3 are transmitted from the transmitter to the receiver and received as first through sixth reception signal units b5 to b10 and first through fourth reception error code units t0 to t3. In addition, the fifth through the sixth reception signal units b5 to b10 are decoded with reference to the first through the fourth reception error code units t0 to t3 into first through sixth decoded signals units which are depicted at b5' to b10' and which are subjected to error correction in the receiver illustrated in FIG. 2.

Referring to FIG. 2 again and FIG. 5, description will be made about error correction of the packet header which is carried out in the receiver. In FIG. 2, the illustrated receiver is supplied with the packet header as a reception packet header and is specified by a decoder portion for decoding the packet header which is produced in the manner illustrated in FIG. 1. The reception packet header includes a reception packet header information signal and a reception error correcting code signal corresponding to the packet header information signal and the error correcting code signal. In FIG. 2, the decoder portion comprises a syndrome calculator 21 and an error detector 23 both of which are structured by a hardware circuit and the remaining hardware circuit which is operable in accordance with a microprogram formed by a special-purpose assembler.

More specifically, the syndrome calculator 21 is successively supplied with each of the first through the sixth reception signal units $b_5$ to $b_{10}$ and the first through the fourth reception error code units $t_0$ to $t_3$.

On the other hand, the first through the sixth reception signal units $b_5$ to $b_{10}$ are sent to a reception register section 26 and memorized in first through sixth reception registers (depicted at $b_5$ to $b_{10}$) of the reception register section 26 each of which is composed of four bits. The syndrome calculator 21 is operable in a known manner to calculate first, second, third, and fourth syndromes $S_0$ to $S_3$ each of which is composed of four bits. Specifically, the illustrated syndrome calculator 21 calculates first, second, third and fourth values $d_0$, $d_1$, $d_2$, and $d_3$ given by:

$$d_0 = b_5 \cdot \alpha^4 \oplus b_6 \cdot \alpha^{12} \oplus b_7 \cdot \alpha^4 \oplus b_8 \cdot \alpha^5 \oplus b_9 \cdot \alpha^3 \oplus b_{10} \cdot \alpha^6 \oplus t_3 \quad (5)$$

$$d_1 = b_5 \cdot \alpha^1 \oplus b_6 \cdot \alpha^{12} \oplus b_7 \cdot \alpha^7 \oplus b_8 \cdot \alpha^0 \oplus b_9 \cdot \alpha^4 \oplus b_{10} \cdot \alpha^0 \oplus t_2 \quad (6)$$

$$d_2 = b_5 \cdot \alpha^7 \oplus b_6 \cdot \alpha^6 \oplus b_7 \cdot \alpha^8 \oplus b_8 \cdot \alpha^7 \oplus b_9 \cdot \alpha^4 \oplus b_{10} \cdot \alpha^4 \oplus t_1 \quad (7)$$

$$d_3 = b_5 \cdot \alpha^7 \oplus b_6 \cdot \alpha^{13} \oplus b_7 \cdot \alpha^6 \oplus b_8 \cdot \alpha^{13} \oplus b_9 \cdot \alpha^{14} \oplus b_{10} \cdot \alpha^{12} \oplus t_0 \quad (8)$$

Thereafter, the syndrome calculator 21 further calculates the first through the fourth syndromes $S_0$ to $S_3$ by the use of the first through the fourth values $d_0$ to $d_3$ in accordance with the following formulae.

$$S_0 = d_0 \oplus d_1 \oplus d_2 \oplus d_3 \quad (9)$$

$$S_1 = d_0 \oplus d_1 \cdot \alpha^1 \oplus d_2 \cdot \alpha^2 \oplus d_3 \cdot \alpha^3 \quad (10)$$

$$S_2 = d_0 \oplus d_1 \cdot \alpha^2 \oplus d_2 \cdot \alpha^4 \oplus d_3 \cdot \alpha^6 \quad (11)$$

$$S_3 = d_0 \oplus d_1 \cdot \alpha^3 \oplus d_2 \cdot \alpha^6 \oplus d_3 \cdot \alpha^9 \quad (12)$$

Herein, it is to be noted that logic circuits which carry out the calculations of Equations 5 through 12 may be a combination of registers, multipliers, and Exclusive OR gates like in FIG. 1. Therefore, it is readily possible for those skilled in the art to design the syndrome calculator formed by such logic circuits. Taking the above into consideration, description will not be made about the syndrome calculator 21 any longer. At any rate, each of the syndromes $S_0$ to $S_3$ is composed of four bits.

The first through the fourth syndromes $S_0$ to $S_3$ are delivered to the error detector 23 on one hand and to first through fourth syndrome registers (depicted at $S_0$ to $S_3$) of the reception register section 26 on the other hand.

Supplied with the first through the fourth syndromes $S_0$ to $S_3$, the error detector 23 detects from the first through the fourth syndromes $S_0$ to $S_3$ whether or not an error or errors are present in the packet header received and produces an error detection signal ED on detection of the error or errors. The error detection signal is sent to a program counter 27 and a process cycle indicator 28 to start them. As a result, the program counter 27 successively supplies a count signal to a read-only memory (ROM) 29 as an address signal.

Inasmuch as the read-only memory 29 memorizes an error correcting program composed of a sequence of instructions, each instruction is successively read out of the read-only memory 29 and delivered to first through fourth instruction decoders 31 to 34. The first through the fourth instruction decoders 31 to 34 supply decoded signals to a timing controller 36 controlled by the process cycle indicator 28 energized by the error detector 23. The first decoder 31 is operable to decode an order of each instruction while the second through the fourth decoders 32 to 34 serve to decode operands which will be depicted at $X_1$, $X_2$, and $X_0$ hereinafter. The timing controller 36 produces first, second, and third gate control signals which may be called A, B, and C gate control signals. Besides, the timing controller 36 delivers a latch signal LA and a jump address signal JP to the reception register section 26 and the program counter 27, respectively. The jump address signal JP specifies an address to be jumped. Moreover, first and second constant signals $CS_1$ and $CS_2$ are also produced from the timing controller 36 to represent first and second constants. A combination of the elements 27, 28, 29, 31 to 34, and 36 may be called a program circuit for producing a sequence of instructions.

In the illustrated example, the reception register section 26 further comprises I, F, K, L, $R_1$, $R_2$, and $R_3$ registers which may be collectively called a register circuit and which are operable in a manner to be described later in addition to the registers $S_0$ to $S_3$ and $b_5$ to $b_{10}$. All of the registers $S_0$ to $S_3$, $b_5$ to $b_{10}$, I, F, K, L, and $R_1$ to $R_3$ are connected to first and second buses 41 and 42 through gates specified by A and B in FIG. 2 in a manner shown in Table 1.

TABLE 1

| No. | Registers | A-Bus Connection | B-Bus Connection | C-Bus Connection | Initial Load | Operation of Registers |
|---|---|---|---|---|---|---|
| 1 | $S_0$ | o | o | x | o | Memorizing syndromes $S_0$ to $S_3$ ($S_2$ and $S_3$ are used as work registers) |
| 2 | $S_1$ | o | o | x | o | |
| 3 | $S_2$ | o | o | o | o | |
| 4 | $S_3$ | o | o | o | o | |
| 5 | $b_5$ | o | x | o | o | Memorizing reception packet header |
| 6 | $b_6$ | o | x | o | o | |
| 7 | $b_7$ | o | x | o | o | |
| 8 | $b_8$ | o | x | o | o | |
| 9 | $b_9$ | o | x | o | o | |
| 10 | $b_{10}$ | o | x | o | o | Memorizing corrected packet header |
| 11 | I | o | x | o | x | Memorizing error position |
| 12 | F | o | x | o | x | Index register for LF and LFR orders |
| 13 | K | o | o | o | x | Memorizing K constant |

TABLE 1-continued

| No. | Registers | A-Bus Connection | B-Bus Connection | C-Bus Connection | Initial Load | Operation of Registers |
|---|---|---|---|---|---|---|
| 14 | L | ○ | ○ | ○ | x | calculated Memorizing L constant |
| 15 | $R_1$ | ○ | ○ | ○ | x | calculated Work registers |
| 16 | $R_2$ | ○ | ○ | ○ | x | |
| 17 | $R_3$ | ○ | ○ | ○ | x | |

For example, the first through the fourth syndrome registers $S_0$ to $S_3$ are connected to both the A and B buses through the gates and are initially loaded with initial values, as understood from third, fourth, and sixth columns of Table 1. The first and the second syndrome registers $S_0$ and $S_1$ are not connected to the C bus 43 while the third and the fourth syndrome registers $S_2$ and $S_3$ are connected to the C bus 43. Anyway, the first through the fourth syndrome registers $S_0$ to $S_3$ serve to memorize the first through the fourth syndromes $S_0$ to $S_3$, respectively. Among others, the third and the fourth syndrome registers $S_2$ and $S_3$ are also used as work registers.

Likewise, the first through the sixth reception registers $b_5$ to $b_{10}$ are connected to the A bus 41 through the A gates and to the C bus 43 but disconnected to the B bus 42. The reception registers $b_5$ to $b_{10}$ are operable to memorize the reception packet header or a corrected packet header. The I register is for memorizing an error position signal indicative of an error position while the F register serves as an index register when specific orders, such as LF and LFR, are issued and will become clear. In addition, the K and the L registers serve to memorize K and L constants which will be described later and which are calculated while the $R_1$ to $R_3$ registers serve as work registers.

Further referring to FIG. 2, the decoder portion comprises a calculation converting read-only memory (ROM) 46, an access section 47 for accessing the ROM 46, an Exclusive OR section 48, a loading section 49, and a comparator section 50, all of which are formed by hardware circuits and which may be referred to as a processing circuit for processing the reception packet header. As illustrated in FIG. 2, the access section 47 and the Exclusive OR section 48 are connected to the A and the B buses 41 and 42 and to the C bus 43 through the C gates $C_1$ and $C_2$, respectively, while the loading section 49 and the comparator section 50 are connected to the A bus 41 through data lines and to the C bus 43 through the C gates $C_3$ and $C_4$. Such A, B, and C gates may be considered as a part of the processing circuit to selectively connect the register and the hardware circuits 46 to 50.

Moreover, the first through the sixth decoded units $b_5'$ to $b_{10}'$ are produced from the first through the sixth reception registers $b_5$ to $b_{10}$ with the error or errors corrected.

Thus, the illustrated decoder portion is divisible into logical calculation circuits, such as the syndrome calculator 21 and the error detector 23, and a microprogram-controlled circuit, such as 26, 27, 28, 29, 31 to 34, 36, 46, 47, 48, 49, and 50. This makes it possible to reduce the decoder circuit in size.

TABLE 2

| No. | Order | Operand | Meaning | Used Hardware | Additional Explanation | Others |
|---|---|---|---|---|---|---|
| 1 | M | $X_1,X_2,X_0$ | $X_1 \cdot X_2 \rightarrow X_0$ | ROM | Special multiplication | (1)$X_1$(A-Bus) $b_5$-$b_{10}$, |
| 2 | DM | $X_1,X_2$ | $X^{-1} \rightarrow X_0$ | ROM | Conversion of specific division to multiplication | $S_0$-$S_3$ $R_1$-$R_3$, K,L,I,F (2)$X_2$(C-Bus) |
| 3 | B | $X_1,X_2$ | $\alpha^{X_1} \rightarrow X_0$ | ROM | Conversion of vector to power | $S_0$-$S_3$, $R_1$-$R_3$ |
| 4 | V | $X_1,X_2$ | $X_1 \rightarrow \alpha^{X_0}$ | ROM | Conversion of power to vector | K,L (3)$X_0$(C-Bus) |
| 5 | 14 | $X_1,X_2$ | $14 - X_1 \rightarrow X_0$ | ROM | Decimal subtraction | $b_5$-$b_{10}$, $R_1$-$R_3$ |
| 6 | 1 | $X_1,X_2$ | $1 + X_1 \rightarrow X_0$ | ROM | Decimal addition | K,L,Z,F, $S_2,S_3$* |
| 7 | E | $X_1,X_2,X_0$ | $X_1 \oplus X_2 \rightarrow X_0$ | Logic | Exclusive OR | (4)T:Constant |
| 8 | L | $X_1,X_0$ | $X_1 \rightarrow X_0$ | Logic | Transfer between registers | (0–15) |
| 9 | LT | T'$X_0$ | T'$\rightarrow X_0$ | Logic | Loading register with constant | T':Constant (0–7) |
| 10 | LF | $X_0$ | $R_{(f)} \rightarrow X_0$ (if F = f) | Logic | Conditional transfer between registers | ADR:Address (0–255) |
| 11 | LFR | $X_1$ | $X_1 \rightarrow R_{(f)}$ (if F = f) | Logic | Conditional transfer between registers | (5)In No.10,11 R(0) = $S_2$ R(1) = $S_3$ |
| 12 | CMP | T,$X_1$ | 1→Eflag (if T = $X_1$) 1→Lflag (if T < $X_1$) 1→Gflag (if T > $X_1$) | Logic | Comparison | R(2) = $S_5$ R(3) = $S_6$ R(4) = $S_7$ R(5) = $S_8$ R(6) = $S_9$ R(7) = $S_{10}$ |
| 13 | JZ | ADR | Jump to ADR (if Eflag = 1) | Logic | Conditional jump | |
| 14 | JG | ADR | Jump to ADR (if Lflag = 1) | Logic | Conditional jump | |
| 15 | JL | ADR | Jump to ADR (if Gflag = 1) | Logic | Conditional jump | |
| 16 | J | ADR | Jump to ADR | Logic | Nonconditional jump | |

TABLE 2-continued

| No. | Order | Operand | Meaning | Used Hardware | Additional Explanation | Others |
|---|---|---|---|---|---|---|
| 17 | END | — | Correction End | — | Completion of error correction | |

In Table 2, orders and operands are enumerated which are issued from the microprogram memorized in the ROM 29 to locate the errors and to correct them when the errors are detected by the error detector 23 (FIG. 2). As tabulated in Table 2, first through seventeenth orders, such as M, DM, B, and the like in the microprogram are exemplified and delivered to the access section 47, the calculation converting RAM 46, the Exclusive OR section 48, the loading section 49, and the comparator section 50 in a manner to be described later. In the operands, the first through the seventeenth orders indicate operations shown in the columns of the meaning and the additional explanation and $X_1$, $X_2$, and $X_0$ represent values on the A bus, the B bus, and the C bus, respectively.

Figure 5:
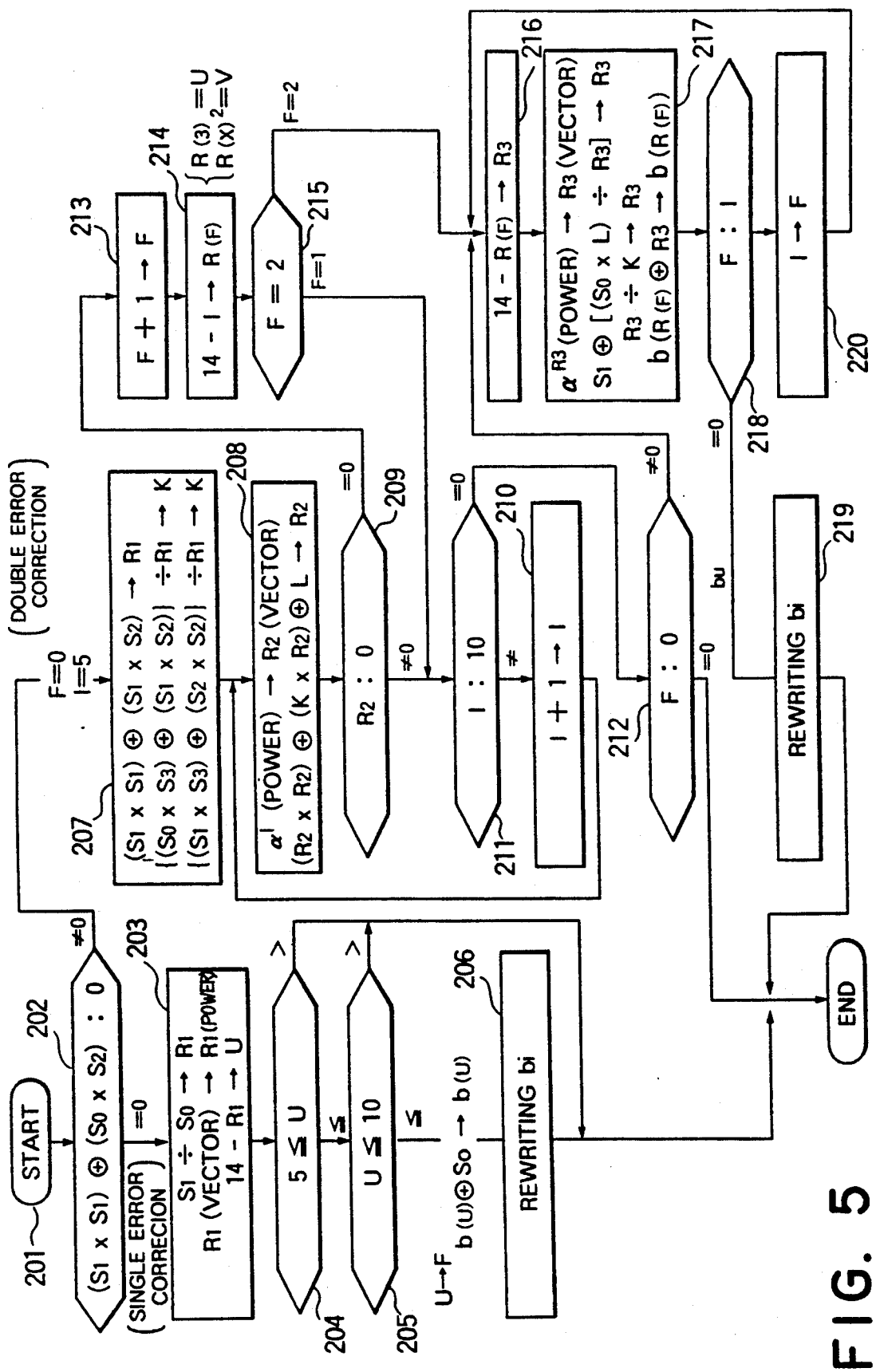
FIG. 5 is a flow chart for use in describing operation of the receiver illustrated in FIG. 3.

Referring to FIG. 5 together with FIG. 2, description will be made about operation of the error correction. Such error correction is started from a first step 201 by the use of the microprogram memorized in the ROM 29. The first step 201 proceeds to a second step 202 at which Exclusive OR is calculated between a square value of the second syndrome $S_1$ and a product of the first syndrome $S_0$ and the third syndrome $S_2$ by the use of the Exclusive OR section 48. Before such Exclusive OR calculation, the second syndrome $S_1$ is read out of the second syndrome register $S_1$ and is delivered to the calculation converting RAM 46 to calculate the square of the second syndrome $S_1$ in accordance with the order of M. Likewise, the first and the third syndromes $S_0$ and $S_2$ are also read out of the first and the third syndrome registers $S_0$ and $S_2$ to calculate the product of both the syndromes. Thereafter, the comparator section 50 compares a result of the Exclusive OR with zero to detect whether or not a single error exists in the reception packet header. If the result of the Exclusive OR is equal to zero, a single error or no error is present in the reception packet header, as known in the art. In this event, the second step 202 is followed by a third step 203 to carry out single error correction. Otherwise, a double error or a t-tuple error more than the double error takes place in the reception packet header. Operation is carried out so as to correct the double error in a manner to be described later.

Herein, it is to be noted that correction of a single and a double error in the Reed-Solomon code is carried out on the basis of a known procedure, although modification is somewhat made in procedure which will be described hereinafter, so as to readily process an error or errors.

More specifically, let the result of the Exclusive OR in the first step 201 be equal to zero and the second step 202 proceed to a third step 203. At the third step 203, the second syndrome $S_1$ is divided by the first syndrome $S_0$ to obtain a result of division which is sent to the $R_1$ register (FIG. 2) and which is memorized as a first content represented by a vector representation. Such division is carried out by the use of the access section 47 and the calculation converting RAM 46. Subsequently, the first content of the $R_1$ register is converted into a power of $\alpha$, as depicted at $\alpha^{R_1}$ in FIG. 5, and memorized as a second content in the $R_1$ register again. Inasmuch as the total symbol number is equal to 15 and can be represented by a polynomial which has a maximum order equal to the fourteenth order, as known in the art, the second content of the $R_1$ register is subtracted from a predetermined constant of 14 to indicate an error symbol position depicted at U.

Herein, it should be recollected that the significant information unit is arranged between the first and the sixth signal units $a_5$ and $a_{10}$ located at fifth through tenth symbol positions, as shown in FIG. 3 and that zeroth through fourth symbol positions are neglected. This shows that error correction may be carried out only between the fifth through the tenth symbol positions.

Taking this into consideration, fourth and fifth steps 204 and 205 are for detecting whether or not the error symbol position U is present within a significant range between the fifth and the tenth symbol positions, both inclusive. If the error symbol position U does not exist within the significant range, the error correction is finished. Otherwise, the error symbol position U is sent to the F register (FIG. 2) to be held therein. The fourth and the fifth steps 204 and 205 are executed by the use of the comparator section 50 illustrated in FIG. 2. Under the circumstances, an error reception symbol positioned at the error symbol position U may be depicted at b(u) and should be corrected.

To this end, Exclusive OR is executed between the error reception symbol b(u) and the first syndrome $S_0$ by the Exclusive OR section 48 to supply a result of the Exclusive OR to one of the first through the sixth reception registers $b_5$ to $b_{10}$ that corresponds to the error reception symbol b(u). In this case, an error symbol is corrected by the above-mentioned Exclusive OR into a correct symbol which is represented by b(i).

At a sixth step 206, the error symbol position b(i) is rewritten by the loading section 49 to be corrected. Thus, correction of the single symbol error is carried out by the third through the sixth steps 203 to 206.

On the other hand, let the result of the Exclusive OR be not equal to zero at the second step 202. In this event, the second step 202 is followed by operation of double error correction which is executed in a manner to be described hereinunder. The double error correction is started by setting the F and the I registers into zero and five, respectively. It is mentioned here that the F and the I registers are loaded with the number of the errors and an error symbol position, respectively. This means that the double error correction is started from the fifth symbol unit on the assumption that no error is detected.

Under the circumstances, operation is carried out at a seventh step 207 which is for calculating Exclusive OR between a square of the second syndromes $S_1$ and a product of the second and the third syndromes $S_1$ and $S_2$. The Exclusive OR calculation is made by the use of the Exclusive OR section 48 and a result of the Exclusive OR calculation is stored in the $R_1$ register as a first content of the $R_1$ register. A first product of the first and the fourth syndromes $S_0$ and $S_3$ is calculated together with a second product of the second and the third syndromes $S_1$ and $S_3$ by the use of the access section 47 and the calculation converting ROM 46. The first and the second products are memorized into the $R_2$ and the $R_3$ registers. Exclusive OR calculation is carried out between the first and the second products by the Exclusive OR section 48 to obtain a first result of the Exclusive OR calculation which is divided by the content of the $R_1$ register into a first result of division. The first result of division is held in the K register. Exclusive OR is carried out between a product of the second and the fourth syndromes $S_1$ and $S_3$ and a square of the third syndromes $S_2$ to calculate a second result of the Exclusive OR. The second result of the Exclusive OR is divided by the first content of the $R_1$ register into a second result of division sent to the K register. Such operation carried out at the seventh step 207 is made in accordance with algorithm determined in accordance with the Reed-Solomon code.

At an eighth step 208, alpha ($\alpha$) to the power stored in the I register is converted into a vector representation which is memorized in the $R_2$ register as a content of the $R_2$ register. In addition, Exclusive OR is carried out between a square of the content of the $R_2$ register and a product of a content of the K register and the content of the $R_2$ register to obtain a partial result of the Exclusive OR. Exclusive OR is further calculated between the partial result and a content of the L register to obtain a total result of the Exclusive OR. The total result is stored in the $R_2$ register.

Thereafter, the eighth step 208 proceeds to a ninth step 209 at which the total result calculated by the eighth step 208 is compared with zero by the comparator section 50. If the total result is not equal to zero, the ninth step 209 proceeds to a tenth step 210 at which the content of the I register is compared with ten by the comparator section 50 to carry out the above-mentioned processing about a next following one of the significant symbol units. From this fact, it is readily understood that the total result of the $R_2$ register becomes equal to zero only when an error is present and, otherwise, the total result does not become equal to zero.

When the content of the I register is not equal to ten, the tenth step 210 is followed by an eleventh step 211 at which unity is added to the content of the I register to obtain (I+1) stored in the I register again. The eighth through the eleventh steps 208 to 211 are repeated until the content of the I register becomes equal to ten.

When the content of the I register becomes equal to ten at the tenth step 210, the tenth step 210 jumps to a twelfth step 212 of detecting whether or not the content of the F register is equal to zero. No error is determined in regard to the reception packet header when the content of the F register becomes equal to zero. In this event, error correction operation is finished without any correction of an error.

At the ninth step 209, it is assumed that the total result of the $R_2$ register is equal to zero. In this event, the ninth step 209 is succeeded by a thirteenth step 213 at which unity is added to the content of the F register. This shows that an error is detected at a symbol unit indicated by the content of the I register. At a fourteenth step 214, the content of the I register is subtracted from the predetermined number of 14 to specify an error symbol unit position which is held in the R registers. The fourteenth step 214 is followed by the fifteenth step 215 which is for judging whether or not the content of the F register is equal to two. The fifteenth step 215 is executed by the use of the comparator section 50. If the content of the F register is equal to unity, the fifteenth step 215 is succeeded by the tenth step 210 to locate an error symbol unit position in the manner mentioned before.

On the other hand, if the content of the F register is equal to two, processing is carried out for correcting a double error in accordance with a known algorithm determined in the Reed-Solomon code. Specifically, the content of the R register is subtracted from the predetermined number of 14 at a sixteenth step 216 to obtain a result of subtraction which is held in the $R_3$ register. At a seventeenth step 217, a power representation of $aR_2$ is converted by the use of the calculation converting ROM 46 into a vector representation of $R_3$ which may be called a vector content of $R_3$. Thereafter, the Exclusive OR is calculated between the second syndrome $S_1$ and $(S_0xL)/R_3$ to attain a result of the Exclusive OR which is stored in the $R_3$ register. A content of the $R_3$ register is divided by the content of the K register into a result of division which is held in the $R_3$ register. Exclusive OR is calculated between the result of the division and b(R(F)) and is sent to the b(R(f)) register which specifies an error symbol unit. Such operation is carried out in accordance with the algorithm determined for the Reed-Solomon code. At an eighteenth step 218, judgement is made whether or not the content of the F register is equal to unity. If the content of the F register is equal to unity, a content bi of the b(R(r)) register is rewritten or corrected at a nineteenth step 219. Thus, a single error symbol is corrected at the nineteenth step 219. On the other hand, if the content of the F register is not equal to unity, the content of the I register is sent to the F register at a twentieth step 220 and returned back to the sixteenth step 216 to correct another error in a manner similar to that illustrated in conjunction with the steps 217, 218, and 219. Anyway, the double error is corrected in the significant symbol units.

As mentioned above, the packet header is formed in the transmitter by the Reed-Solomon code which is a combination of a significant information signal of 24 bits with an error correcting code of 16 bits. Such use of the Reed-Solomon code enables error correction of two half bytes in the receiver by the use of the microgram which defines procedure illustrated in FIG. 5. With this structure, it is possible to reduce the size of a hardware circuit and to shorten the processing time. In addition, it is possible to reliably transmit a data signal, a speech signal, and an image signal without necessity of distinction among them and without necessity of re-transmission.

While this invention has thus far been described in conjunction with a preferred embodiment thereof, it will readily be possible for those skilled in the art to put this invention into practice in various other manners. For example, a wide variety of the Reed-Solomon codes may be used for correcting the error or errors. In FIG. 2, the calculation converting ROM 46 may be replaced by an RAM.

What is claimed is:

1. A transmitter for transmitting a packet of information which includes an input signal which successively conveys an information signal which may comprise a selected one of a data signal, a speech signal, and an image signal and which is preceded by a header information signal, said transmitter comprising:

packet header forming means responsive to said header information signal and operable in accordance with a predetermined algorithm for producing a Reed-Solomon code to form a packet header which is composed of said header information signal and an error correcting code signal for correcting said header information signal, said error correcting code signal being formed by the Reed-Solomon code, said packet header forming means comprising an input terminal for receiving one or more signal units in sequence; a plurality of multipliers for multiplying each of said signal units by predetermined constants; a plurality of registers; a plurality of exclusive-OR circuits, each having a first input coupled to an output of a respective one of said multipliers and a second input coupled to an output of a respective one of said registers, wherein said multipliers, registers, and exclusive-OR circuits carry out said predetermined algorithm for producing a Reed-Solomon code to generate error code units as said error correcting code signal; and signal producing means for producing said packet header followed by said input signals accompanied by no error correcting code to form said packet of information.

2. A receiver for use in combination with the transmitter claimed in claim 1 for receiving said packet of information as a reception packet including a reception packet header corresponding to said packet header and to produce a reception packet header information signal and a reception error correcting code signal corresponding to said packet header information and said error correcting code signal, said receiver comprising:

syndrome calculation means responsive to said reception packet header for calculating a plurality of syndromes on the basis of preselected formulae determined for the Reed-Solomon code;

error detecting means coupled to said syndrome calculating means for detecting occurrence of an error in said reception packet header by monitoring said syndromes to produce an error detection signal on detection of said error; and error correcting means formed by a hardware circuit, energized by said error detection signal, and operable in accordance with a program determined for processing the Reed-Solomon code, for correcting said error in said reception packet header to produce the reception packet header information signal subjected to the error correction.

3. A receiver as claimed in claim 2, said program being composed of a sequence of instructions, wherein said error correcting means comprises:

program means energized by said error detection signal for storing said program to successively produce each of said instructions;

register means responsive to said reception packet header for registering said reception packet header; and processing means coupled to said program means and said registering means for processing said reception packet header in accordance with said program to correct said error in the reception packet header and to produce the reception packet header information signal.

4. A receiver as claimed in claim 3, said instructions including a first instruction for carrying out conversions between vector and power calculations, a second instruction for carrying out Exclusive OR, and a third instruction for comparison, wherein said processing means comprises:

gate means coupled to said register means and said program means for selectively producing said reception error correcting code signal and said reception packet header information signal in accordance with each of said instructions;

calculation converting means coupled to said gate means on production of said first instruction for carrying out conversions between vector and power calculations;

an Exclusive OR section coupled to said gate means on production of said second instruction for carrying out an Exclusive OR operation; and a comparator section coupled to said gate means on production of said third instruction for carrying out a comparison operation.

5. An error correcting system for use in transmitting a packet of information from a transmitter to a receiver, said packet of information including an input signal and a header information signal which precedes said input signal and being received by said receiver as a reception packet including a reception header information signal corresponding to said header information signal, said transmitter comprising:

packet header forming means responsive to said header information signal and operable in accordance with a predetermined algorithm determined for producing a Reed-Solomon code, for forming a packet header which is composed of said header information signal and an error correcting code signal for correcting code signal being formed by the Reed-Solomon code; and signal producing means for producing said packet header followed by said input signal to form said packet of information;

said receiver being supplied with said packet header as the reception packet header which includes a reception error correcting code signal corresponding to said error correcting code signal in addition to said reception header information signal, said receiver comprising:

syndrome calculation means responsive to said reception packet header for calculating a plurality of syndromes on the basis of preselected formulae determined for the Reed-Solomon code;

error detecting means coupled to said syndrome calculating means for detecting occurrence of an error in said reception packet header by monitoring said syndromes to produce an error detection signal on detection of said error; and error correcting means formed by a hardware circuit, energized by said error detection signal, and operable in accordance with a program determined for processing the Reed-Solomon code, for correcting said error in said reception packet header to produce the reception packet header information signal subjected to the error correction.

* * * * *

UNITED STATES PATENT AND TRADEMARK OFFICE
CERTIFICATE OF CORRECTION

PATENT NO.   : 5,327,438
DATED        : July 5, 1994
INVENTOR(S)  : Hideki OKUYAMA It is certified that error(s) appears in the above-identified patent and that said Letters Patent is hereby corrected as shown below:

Column 8, Table 2, No. 7, delete "⊖" and insert --⊕--.

Column 12, line 26, delete "(r)" and insert --(f)--.

Signed and Sealed this

Eighth Day of November, 1994

Attest:

BRUCE LEHMAN

*Attesting Officer*   Commissioner of Patents and Trademarks